United States Patent [19]

Zirps

[11] Patent Number: 4,790,729
[45] Date of Patent: Dec. 13, 1988

[54] BRAKE EQUIPMENT FOR A HYDRAULIC VEHICLE BRAKE SYSTEM

[75] Inventor: Wilhelm Zirps, Hemmingen, Fed. Rep. of Germany

[73] Assignee: Robert Bosch GmbH, Stuttgart, Fed. Rep. of Germany

[21] Appl. No.: 38,113

[22] Filed: Apr. 14, 1987

[30] Foreign Application Priority Data

Jun. 4, 1986 [DE] Fed. Rep. of Germany ....... 3618835

[51] Int. Cl.⁴ .............................................. F04B 21/00
[52] U.S. Cl. ..................................... 417/363; 92/128; 248/603; 267/136; 267/153
[58] Field of Search ................ 417/363; 267/136, 153; 92/128; 248/603

[56] References Cited

U.S. PATENT DOCUMENTS

| | | | |
|---|---|---|---|
| 976,126 | 11/1910 | Gerb | 248/603 |
| 1,638,968 | 8/1927 | Soderberg | 417/363 |
| 2,717,748 | 9/1955 | Martinet | 417/363 X |
| 3,079,176 | 2/1963 | Duke et al. | 267/153 X |
| 3,161,388 | 12/1964 | Appleton | 417/363 X |
| 3,460,786 | 8/1969 | Riven | 267/153 X |
| 3,663,002 | 5/1972 | Gergle et al. | 267/136 |
| 4,104,007 | 8/1978 | Hehl | 417/363 X |
| 4,334,835 | 6/1982 | Dyhr et al. | 417/363 |
| 4,580,666 | 4/1986 | Ferguson | 267/136 X |
| 4,590,964 | 5/1986 | Beardmore | 417/363 X |

FOREIGN PATENT DOCUMENTS

| | | | |
|---|---|---|---|
| 229187 | 1/1959 | Australia | 267/153 |
| 592538 | 2/1960 | Canada | 417/363 |
| 612346 | 1/1961 | Canada | 417/363 |
| 1281685 | 12/1961 | France | 267/153 |
| 57-108481 | 7/1982 | Japan | 417/363 |
| 966283 | 10/1982 | U.S.S.R. | 417/363 |

*Primary Examiner*—Carlton R. Croyle
*Assistant Examiner*—Ted Olds
*Attorney, Agent, or Firm*—Edwin E. Greigg

[57] ABSTRACT

Brake equipment for a hydraulic vehicle brake system which has an actuating assembly and a feed pump secured elastically thereon. The two communicate with one another via at least one suction and pressure line each. To assure an inexpensive, dependable flexible line connection between component parts that move relative to one another, the suction and pressure lines are embodied as housing bores in the assembly and pump housings and for a liquid-tight connection of two successive housings bores at a time extending in the course of the lines in the assembly housing on the one hand and in the pump housing on the other, at least one connecting tube is disposed in two flush bearing bores in the assembly housing and in the pump housing. The connecting tube rests pivotably and longitudinally displaceably in the bearing bores sealing off the bearing bores.

20 Claims, 4 Drawing Sheets

BRAKE EQUIPMENT FOR A HYDRAULIC VEHICLE BRAKE SYSTEM

BACKGROUND OF THE INVENTION

The invention is based on brake equipment for a hydraulic vehicle brake system.

Such brake equipment, which includes an electrohydraulic actuating assembly and a recirculating pump, is mounted on the vehicle body, for example on the splashboard in the engine compartment. Since because it pumps nonuniform amounts of fluid, the recirculating pump generates considerable noise. It is non-rigidly suspended on the actuating assembly housing with elastic bearings, to prevent the transmission of structure-borne noise. Because of the existing relative movement of the housing parts, the connecting lines, such as suction and pressure lines, between the two housing parts must be embodied in such a way that the recirculating pump is assured to be movable inside the elastic bearing. The recirculating pump will transmit no more than a very slight force and moment to the actuating assembly, and that pressure action in the connecting lines will not generate any force or moment.

In known brake equipment of the above type, the pressure and intake lines are therefore embodied as flexible hoses. To prevent the transmission of force or moment, the hoses are made relatively long. However, high-pressure hoses are quite expensive, and they occupy a great deal of space; this is a particularly serious consideration in brake equipment for dual-circuit brake systems, because then two pressure lines and two suction lines, for a total of four connecting hoses, must be provided between the actuating assembly and the recirculating pump. Moreover, high-pressure hoses are not recoil-free, because of their relative rigidity. In the lower frequency range, they induce structure-borne sound and pass it on as well.

OBJECT AND SUMMARY OF THE INVENTION

The brake equipment according to the invention has the advantage over the prior art that the suction and pressure lines can be produced simply and at a favorable cost and require extremely little space. Except for the relatively slight frictional force and moment of the connecting tubes, no force or moment is generated or transmitted. The liquid-tight flexible connection between the assembly housing and the pump housing is dependable in operation and is distinguished by a long service life.

Other advantageous features of and improvements to the brake equipment are disclosed herein.

An advantageous feature of the invention resides in the manner in which the connecting tubes are embodied, when embodied as set forth herein, frictional force between the connecting tubes and the bearing bore is kept extremely low.

Another advantageous feature of the invention is to provide connecting tubes which are simple and inexpensive to produce.

Another advantageous feature of the invention is to provide a construction in which the connecting tubes can be accommodated inside the elastic bearings, or the elastic bearings can at the same time be accommodated in bearing bores required for the connecting tubes. This saves considerable space.

Another advantageous feature of the invention resides in the manufacturing considerations: first of the elastic bearing, and second of the liquid-tight flexible connection of the assembly housing and the pump housing with one another.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
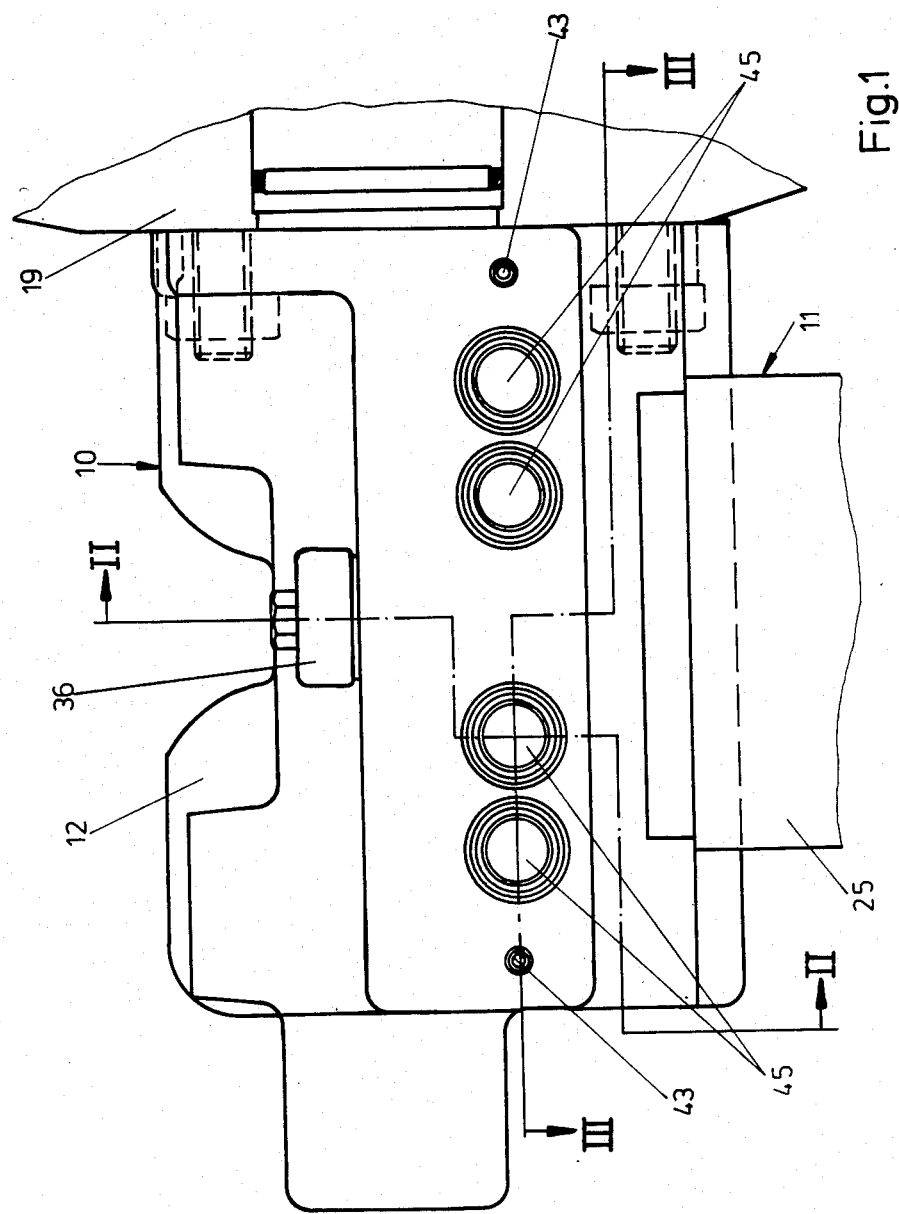
FIG. 1 is a side view of brake equipment for a hydraulic vehicle brake system equipped with an anti-lock or anti-skid brake system.

The brake equipment shown in a side view in FIG. 1 and in various sectional views in FIGS. 2-5 is intended for use in a hydraulic dual-circuit brake system of a motor vehicle equipped with an anti-lock or anti-skid brake system, abbreviated as ABS. The brake equipment is an integral component of the anti-skid brake system, which additionally includes an electronic regulator and four wheel sensors, which in a known manner detect the rpm of the individual wheels and furnish electrical signals accordingly to the electronic regulator.

Figure 2:
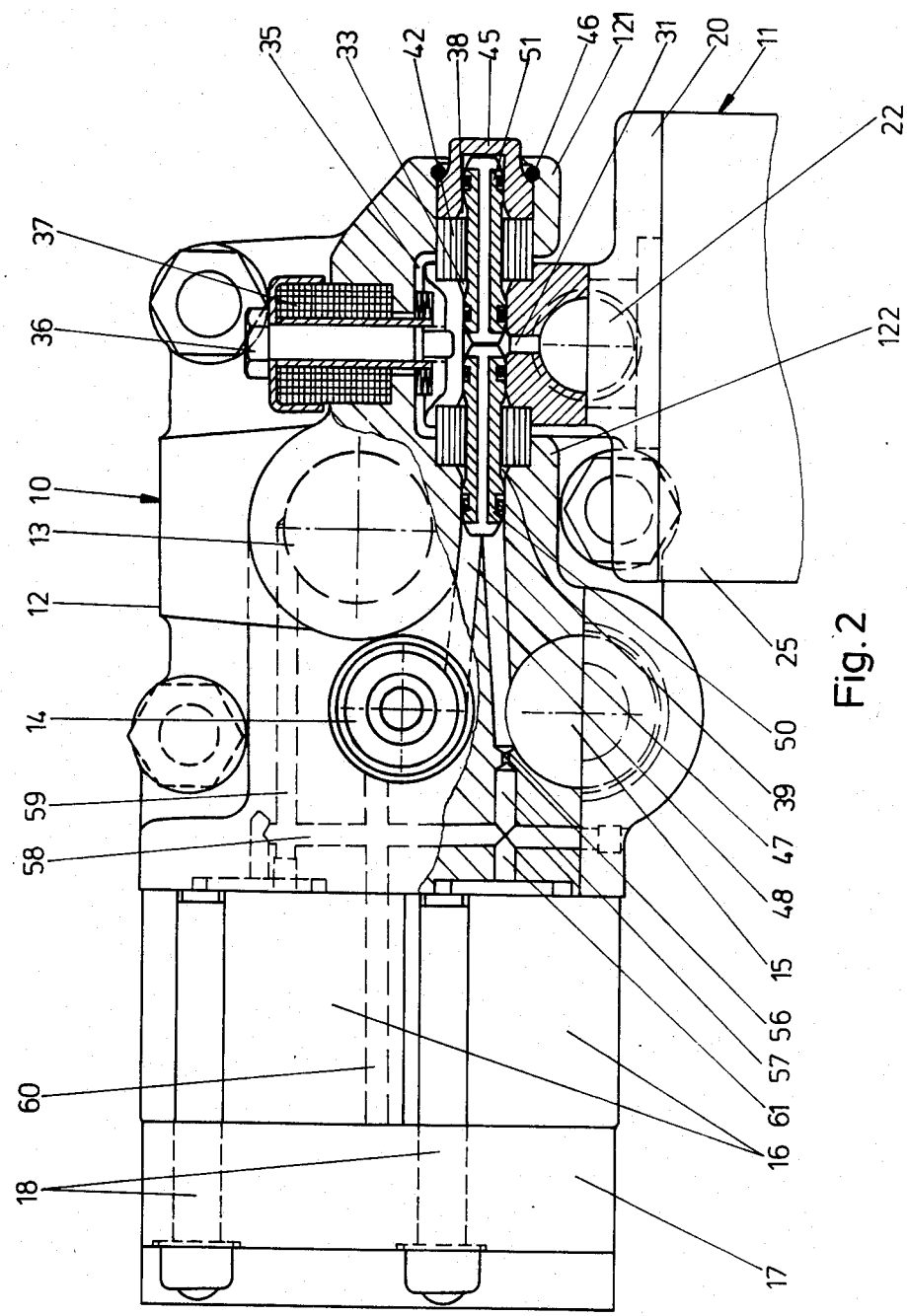
FIG. 2 is a section taken along the line II—II of FIG. 1.

The brake equipment includes an actuating assembly 10 and a feed pump 11. In an assembly housing 12, the actuating assembly 10 includes a dual-circuit master brake cylinder 13, two reservoir chambers 14 for returning brake fluid, two damping chambers 15 and four magnetic valves 16 for controlling pressure in the wheel brake cylinders, to which end the brake equipment is connected via four brake lines to each of the wheel brake cylinders associated with the wheels. In FIG. 2, only one reservoir chamber 14, one damping chamber 15 and two magnetic valves 16 are visible, because the various equivalent components are disposed one behind the other as seen by an observer. Located in each reservoir chamber 14 is one spring-biased piston (not shown), which is deflected by the inflow of brake fluid, so that the volume of the reservoir chamber increases. The magnetic valves 16 are retained in a cap 17, which is flanged to the assembly housing 12 with screws 18. Also located in the cap 17 are the connections (not shown) for the brake lines leading to the wheel brake cylinders. As indicated in FIG. 1, a brake booster 19 is also screwed to the assembly housing 12; this component may be embodied as a vacuum-type brake booster or as a hydraulic brake booster.

Figure 3:
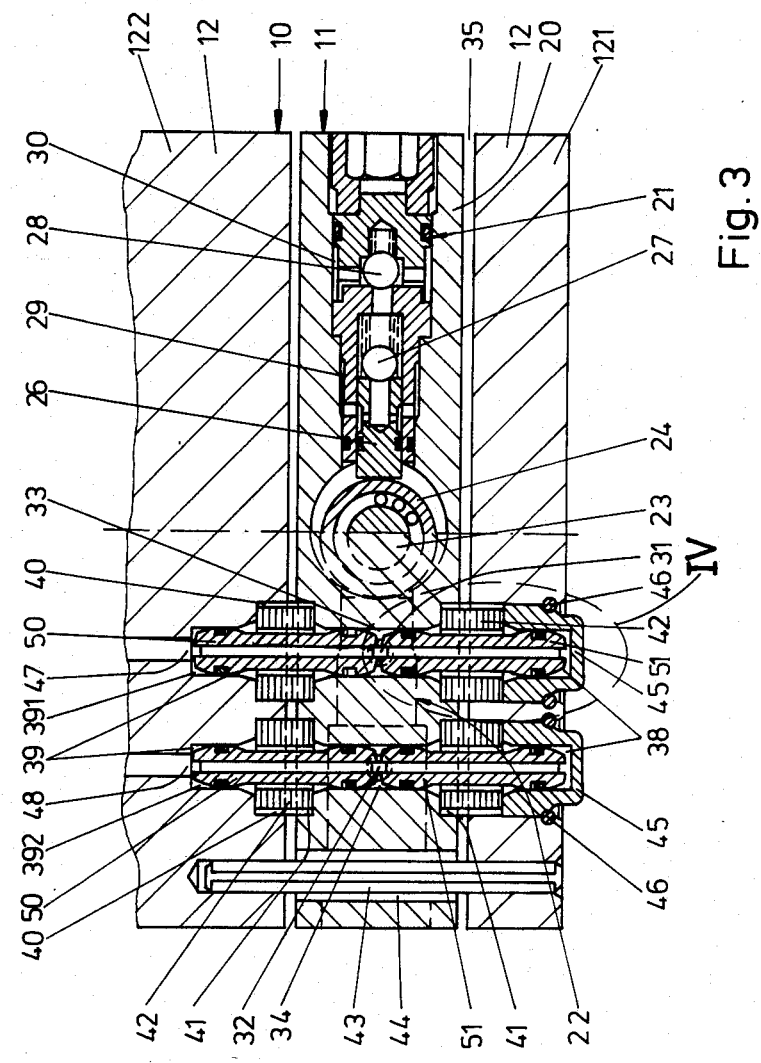
FIG. 3 is a section taken along the line III—III of FIG. 1.
Figure 4:
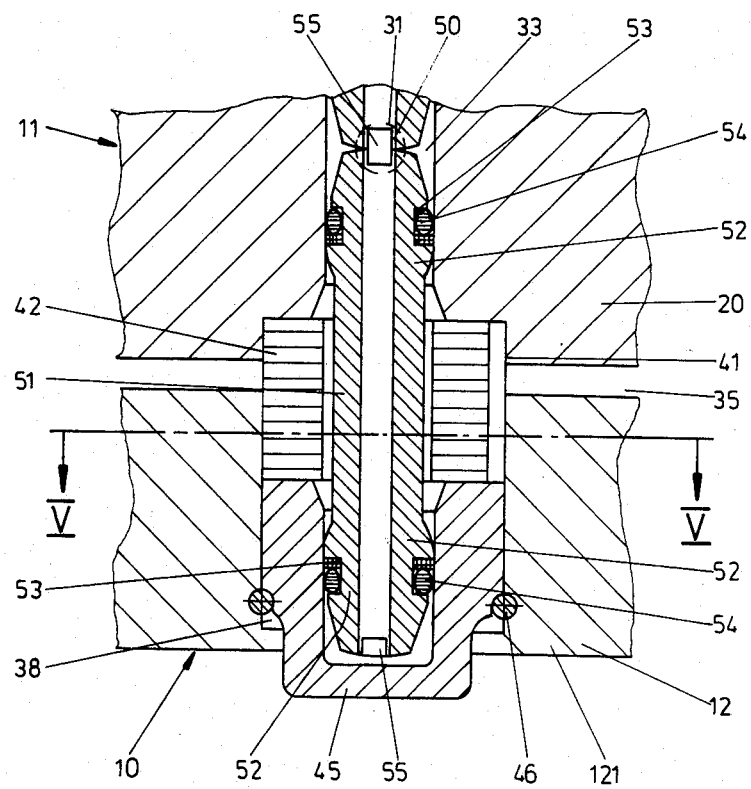
FIG. 4 is an enlarged view of the detail shown at IV in FIG. 3.
Figure 5:
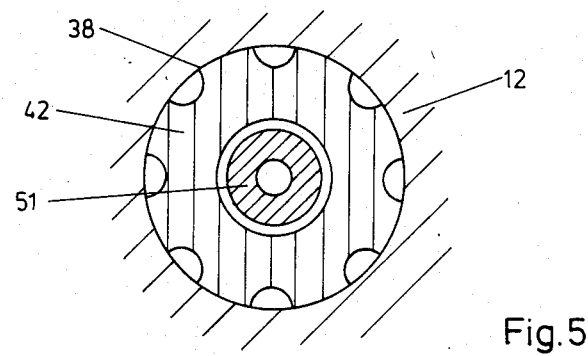
FIG. 5 is a section taken along the line V—V of FIG. 4.

As shown particularly in FIG. 3, the feed pump 11 contains two pump elements 21, 22 in a pump housing 20, which are driven via an eccentric element 23 and a needle bearing 24. In FIG. 3, the pump element 22 is shown in dashed lines, while the pump element 23 is seen in longitudinal section. The eccentric element 23 is driven by an electric motor 25 that is flanged to the pump housing 20 (see FIG. 2). One piston 26 driven by the eccentric element 23, one suction valve 27 and one pressure valve 28, which are located in line with one another and divide a suction chamber 29 from a pressure chamber 30, are located in each pump element 21, 22. The suction chamber 29 communicates via a bore 31 with a bearing bore 33, and the pressure chamber 30 communicates via a bore 32 with a bearing bore 34. The bearing bores 33, 34 are aligned transversely to the longitudinal axis of the pump elements 21, 22 and discharge freely at the pump housing 20. In FIG. 3, the bearing bores 33, 34 associated with the pump element 22 are visible. Since two bearing bores 33, 34 are also associated with the pump element 21, a total of four bearing bores are disposed spaced apart from and beside one another in the axial direction of the pump elements 21, 22.

As seen in FIG. 2, the pump housing 20 is approximately T-shaped in cross section and with its wide middle member protrudes with play into a recess 35 of approximately U-shaped cross section extending in the assembly housing 12 along the axes of the pump elements 21, 22 and is non-rigidly suspended in the assembly housing 12 at the bottom of the recess 35 by means of a screw bolt 36, screwed into the end face of the pump housing 20, and a bushing 37 of rubber-elastic material. Four bearing bores 38 and 39 each are provided in each of the housing parts 121, 122 of the assembly housing 12 that define the two legs of the recess. Two bearing bores 38, 39 each in the two housing parts 121, 122 are located axially facing one another and are each in alignment with a respective one bearing bore 33 or 34 in the pump housing 20. Thus there is a total of eight bearing bores 38, 39, facing one another in pairs, in the assembly housing 12 and four bearing bores 33, 34 in the pump housing 20. The bearing bores 39 in the housing part 122 are embodied as blind bores and where they emerge from the housing part 122 they have a circular-annular enargement 40. The bearing bores 38 in the housing part 121 are embodied as through bores and have a diameter equivalent to the diameter of the annular enlargement of the bearing bores 39. Where they emerge from the pump housing 20, the bearing bores 33, 34 in the pump housing 20 also have an annular enlargement 41, of the same diameter. On their end remote from the pump housing 20, the bearing bores 38 in the housing part 121 are covered with a cap 45, which protrudes partway into the bearing bore 38 and there is retained in the bore wall with a snap ring 46 (see also the enlarged view provided in FIG. 4). Sheaths 42 of rubber-elastic material are fastened in the pairs of opposed enlargements 40, 41 of the bearing bores 39 or 33, 34 on the one hand and in the annular enlargements 41 of the bearing bores 33, 34 and the bearing bores 38 in the housing part 121 on the other; by this means, the pump housing 20 and the electric motor 25 flanged to it are supported elastically and with play in the assembly housing 12. In the four bearing bores 33, 34 in the pump housing 20 there are a total of eight sheaths 42 facing one another in pairs and hence a total of eight elastic bearings. Two pins 43, only one of which is visible in FIG. 3, pressed into the assembly housing 12 each penetrate one through bore 44 aligned parallel to the bearing bores 33, 34 in the pump housing 20, the through bores 44 being dimensioned with a diameter substantially larger than that of the pins 43, so that these pins 43 thereby limit the relative motion of the pump housing 20 inside the assembly housing 12.

Two suction lines and two pressure lines are provided between the feed pump 10 and the actuating assembly. The suction lines connect the suction chamber 29 of each of the two pump elements 21, 22 with a reservoir chamber 14. The pressure lines connect the pressure chamber 30 of each of the two pump elements 21, 22 with a damping chamber 15 in the assembly housing 12. In this case the suction and pressure lines are embodied as housing bores, each housing bore 47 or 48 discharging at the bore bottom of the bearing bores 39 in the housing part 122. The housing bore 47 leads from a reservoir chamber 14 to a bearing bore 391, which is flush with the bearing bore 33 in the pump housing 20, and the housing bore 48 leads from a damping chamber 15 to the bearing bore 392, which is flush with the bearing bore 34 in the pump housing 20. This description is equally applicable to each pumping element 21 or 22, so that a total of two housing bores 47 and two housing bores 48 are provided.

For the liquid-tight connection of the housing bores 47, 48 via the bearing bores 391 and 32 on the one hand and of the bores 31, 32 leading to the pressure or suction chamber 29, 30 of the pump elements 21, 22 via the bearing bores 33, 34 in the pump housing 20, on the other, two sets of connecting tubes 50, 51 are provided, which are inserted axially one after the other, each pair into one set of three bearing bores 391, 33, 38 or 392, 34, 38 that are flush with one another in the assembly housing 12 and in the pump housing 20, respectively. The insertion of the connecting tubes 50, 51 is performed before the caps 45 are introduced into the bearing bores 38, the two connecting tubes 50, 51 being pushed all the way through the sheaths 42. The inside diameter of the sheaths 42 is dimensioned accordingly. After the insertion of the connecting tubes 50, 51, each tube 50, 51 is surrounded with radial play by one sheath 42. The connecting tubes 50, 51 are embodied such that while sealing the bearing bores 33, 34, 38, 39 they rest pivotably and longitudinally displaceably in the bearing bores 33, 34, 38, 39 and hence do not impede the relative motion of the pump housing 20 with respect to the assembly housing 12. To this end, each of the identically embodied connecting tubes 50, 51 has a ball-like enlargement near the two face ends and has a sealing ring 54 resting in an outer groove 53 of the enlargement 52; the sealing ring extends along the equator of the ball-like enlargements 52 (see FIG. 4). With this sealing ring 54, the enlargements 52 presses against the bore walls of the bearing bores 33, 34 in the pump housing 20 and of the bearing bores 39, or into the caps 45, and as a result the mouths of the bores 31, 32 in the bearing bores 33, 34 or of the housing bores 47, 48 in the bearing bores 391, 392 are sealed off from the vicinity of the sheaths 42. To assure the pivotability of the connecting tubes 50, 51 while keeping the frictional force at a minimum, the part of the contour of the enlargements 42 that extends on the sealing ring sides remote from the end faces of the connecting tubes 50, 51 is embodied spherically, and the part of the enlargement contour that extends on the sealing ring sides facing the end faces of the connecting tubes 50, 51 is embodied conically. One diametrical transverse groove 55 each (see FIG. 4) is provided on the end faces of the connecting tubes, so that even when the connecting tubes 50, 51 are in contact with their end faces, there is communication between the hollow interior of the connecting tubes 50, 51 and the bearing bores 33, 34, 38, 39. The connecting tubes 50, 51 can be produced in a simple manner from aluminum tubing, and the enlargements 52 can be obtained by compressing each end. While the connecting tubes 50 resting in the bearing bores 33, 34 of the pump housing 20 on the one hand and in the bearing bores 39 in the assembly housing 12 on the other are part of the suction and pressure lines between the feed pump 11 and the actuating assembly and have both a fluid-carrying function and a sealing off from fluid function. The connecting tubes 51 resting in the bearing bores 33, 34 of the pump housing 20 on the one hand and in the bearing bores 38 of the assembly housing 12 on the other have solely a sealing function, because they need merely seal off the bearing bores 33, 34 from the elastic bearing locations represented by the sheaths 42. These connecting tubes 51 could accordingly also be embodied as solid cylinders. However, embodying all the connecting tubes 50, 51 identically has a favorable effect on the production cost.

It should also be noted that one damping chamber 15 each communicates with the dual-circuit master brake cylinder 13 via a throttle 56, to smooth out the non-uniformity of the feed pump 11 and bores 57, 58, 59 and 61 in the assembly housing 12. Via the magnetic valves 16, the communication between the master brake cylinder 13 and the brake lines can be either interrupted or established. In the same switching state of the magnetic valves 16, connections between the reservoir chambers 14 and the brake lines that exist via conduits 60 in the assembly housing 12 are opened or blocked.

The mode of operation of the brake equipment described above is as follows:

If a wheel during breaking reaches the skid limit, then the pressure in the corresponding wheel brake cylinder is decreased by the electronic regulator. To this end, the associated magnetic valve 16 is activated, which switches over and disconnects the brake line leading to the wheel brake cylinder from the dual-circuit master brake cylinder 13 and connects it to one of the two conduits 60, each of which leads to one of the two reservoir chambers 14. Brake fluid thereby flows into the reservoir chamber 14, which increases in volume. At the same time, the electric motor 25 of the feed pump 11 is activated. The feed pump 11 starts up and aspirates the brake fluid, flowing back into the reservoir chamber 14 via the housing bore 47, the bearing bore 391, the connecting tube 50, the bearing bore 33 in the pump housing 20 and via the bore 31 in the pump housing 20, into the suction chamber 29. From there, the brake fluid is pumped into the pressure chamber 30 and from there flows via the bore 32 and the bearing bore 34 in the pump housing 20, the connection 50, the bearing bore 392 in the assembly housing 12 and via the housing bore 48, into a damping chamber 15. Via the throttle 56 and the bores 57, 58 and 59, the brake fluid reaches one of the work chambers of the master brake cylinder 13, where it pushes the piston and the brake pedal back.

When the danger of skidding lessens, the pressure in the corresponding wheel brake cylinder is again raised. To this end, the magnetic valve 16 and the electric motor 25 of the feed pump 11 are shut off again. The corresponding work chamber of the master brake cylinder 13 then communicates once again with the brake line connection in the cap 17, via the bores 59, 58 and 61 and via the associated magnetic valve 16. The conduit 60 is blocked off from the brake line connection.

In this procedure, via the connecting tubes 50 a liquid-tight flexible connection is established between the bearing bore 33 in the pump housing 20 and the bearing bore 391 in the assembly housing 12, on the one hand, and the bearing bore 34 in the pump housing 20 and the bearing bore 392 in the assembly housing 12, on the other, so that the feed pump 11 can vibrate freely, within limits, in the actuating assembly 10 so that it is disconnected, in terms of structure-borne sound, from the actuating assembly 10 and the vehicle body. The connecting tubes 51 serve solely to effect liquid-proof sealing with respect to the elastic bearings embodied by the sheaths 42, resting on the one hand in the bearing bores 38 in the housing part 121 of the assembly housing 12 and on the other hand in the enlargements 40 of the bearing bores 33, 34 in the pump housing 20.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. Brake equipment for a hydraulic vehicle brake system, including an assembly housing and an electrically driven feed pump in a feed pump housing which is suspended in elastic bearings on said assembly housing in which said pump communicates with said assembly housing via at least one pressure line, said assembly housing and said pump housing includes suction and pressure lines which comprise housing bores, connection bores and bearing bores, said housing bores being in said pump housing and communicating with said pump, said connection bores being in said assembly housing, at least one connecting tube (50) being disposed in sets of two of said bearing bores which are flush with one another, one of which is disposed in the assembly housing and the other of which is disposed in said pump housing, assembled in a pivotable and longitudinally displaceable manner sealing off said bearing bores; said assembly housing and said pump housing being capable of executing a limited relative movement with respect to one another; and a respective one of said housing bores and said connection bores communicating through associated sets of bearing bores with the end of said connecting tube axially remote from the connection bore being sealed off.

2. Brake equipment as defined by claim 1, in which said connecting tube (50) includes ball-like enlargements (52) near opposite face ends, and for sealing off the bearing bores (33, 391; 34, 392) said connecting tube includes sealing ring (54) resting in an outer groove (53) in each enlargement (52), and that at least a part of the contour of the enlargment that extends on the sealing ring sides remote from the end face of the connecting tube (50) is spherically embodied.

3. Brake equipment as defined by claim 2, in which a part of the contour of the enlargement that extends on the sealing ring sides facing the end faces of the connecting tube (50) is conically embodied.

4. Brake equipment as defined by claim 2, in which said sealing rings (54) each extend along an equator of the spherical enlargements (52).

5. Brake equipment as defined by claim 3, in which said sealing rings (54) each extend along an equator of the spherical enlargements (52).

6. Brake equipment as defined by claim 2, in which said connecting tube (50) is embodied as an aluminum tube.

7. Brake equipment as defined by claim 1, in which said elastic bearings for suspending the pump housing (20) on the assembly housing (12) have sheaths (42) of rubber-elastic material, and that each sheath (42) surrounds a connecting tube (50) with radial play and is fastened in opposed annular enlargments (40, 41) of the bearing bores (391, 33; 392, 34) that are flush with one another in the assembly housing and pump housing (12, 20).

8. Brake equipment as defined by claim 1, in which said assembly housing (12) has a continuous longitudinal recess (35) of approximately U-shaped cross section, into which at least part of the pump housing (20) protrudes with play, that in each of the housing parts (121, 122) of the assembly housing (12) that define two legs of a recess (35), at least two bearing bores (38, 39) are disposed, which are each flush with the respective bearing bore (39, 38) of the opposed, leg-defining housing part (122, 121) and with the at least two bearing bores (33, 34) in the inserted pump housing (20), and that in each of the respective three bearing bores (38, 33, 39; 38, 34, 39) flush with one another, two connecting tubes (50, 51) abutting one another at their face ends rest in the bearing bores (33, 34), one of each pair of connecting tubes protruding into a different bearing bore (38 or 39) of the assembly housing (12).

9. Brake equipment as defined by claim 8, in which said bearing bores (39) in one leg-defining housing part (122) are embodied as blind bores, in the bore bottom of each of which one housing bore (47, 48) belonging to the assembly housing discharges, and that the bearing bores (38) in the opposed leg-defining housing part (121) are embodied as through bores, which on an end remote from the pump housing (20) are closed off in a liquid-tight manner by means of a cap (45).

10. Brake equipment as defined by claim 8, in which a diametrical transverse groove (55) extends in each face end of the connecting tubes (50, 51).

11. Brake equipment as defined by claim 9, in which a diametrical transverse groove (55) extends in each face end of the connecting tubes (50, 51).

12. Brake equipment as defined by claim 8, in which each of the connecting tubes (50, 51) is surrounded with play by a rubber-elastic sheath (42), each of which forms an elastic bearing for a feed pump (11) in an actuating assembly (10).

13. Brake equipment as defined by claim 9, in which each of the connecting tubes (50, 51) is surrounded with play by a rubber-elastic sheath (42), each of which forms an elastic bearing for a feed pump (11) in an actuating assembly (10).

14. Brake equipment as defined by claim 10, in which each of the connecting tubes (50, 51) is surrounded with play by a rubber-elastic sheath (42), each of which forms an elastic bearing for a feed pump (11) in an actuating assembly (10).

15. Brake equipment as defined by claim 11, in which each of the connecting tubes (50, 51) is surrounded with play by a rubber-elastic sheath (42), each of which forms an elastic bearing for a feed pump (11) in an actuating assembly (10).

16. Brake equipment as defined by claim 6, in which a dual-circuit brake system includes an assembly housing (12), two separate reservoir chambers (14), two separate pressure chambers (15), and a total of eight bearing bores (38, 39) flush with one another in pairs and said pump housing (20) includes a total of four bearing bores (33, 34) which are each aligned in the longitudinal axis with the bearing bores (38, 39) flush with one another in pairs in the assembly housing (12).

17. Brake equipment as defined by claim 12, in which a dual-circuit brake system includes an assembly housing (12), two separate reservoir chambers (14), two separate pressure chambers (15), and a total of eight bearing bores (38, 39) flush with one another in pairs and said pump housing (20) includes a total of four bearing bores (33, 34) which are each aligned in the longitudinal axis with the bearing bores (38, 39) flush with one another in pairs in the assembly housing (12).

18. Brake equipment as defined by claim 13, in which a dual-circuit brake system includes an assembly housing (12), two separate reservoir chambers (14), two separate pressure chambers (15), and a total of eight bearing bores (38, 39) flush with one another in pairs and said pump housing (20) includes a total of four bearing bores (33, 34) which are each aligned in the longitudinal axis with the bearing bores (38, 39) flush with one another in pairs in the assembly housing (12).

19. Brake equipment as defined by claim 14, in which a dual-circuit brake system includes an assembly housing (12), two separate reservoir chambers (14), two separate pressure chambers (15), and a total of eight bearing bores (38, 39) flush with one another in pairs and said pump housing (20) includes a total of four bearing bores (33, 34) which are each aligned in the longitudinal axis with the bearing bores (38, 39) flush with one another in pairs in the assembly housing (12).

20. Brake equipment as defined by claim 15, in which a dual-circuit brake system includes an assembly housing (12), two separate reservoir chambers (14), two separate pressure chambers (15), and a total of eight bearing bores (38, 39) flush with one another in pairs and said pump housing (20) includes a total of four bearing bores (33, 34) which are each aligned in the longitudinal axis with the bearing bores (38, 39) flush with one another in pairs in the assembly housing (12).

* * * * *